(12) United States Patent
Tsuchida

(10) Patent No.: US 11,124,632 B2
(45) Date of Patent: Sep. 21, 2021

(54) RUBBER COMPOSITION FOR TIRES, AND PNEUMATIC TIRES

(71) Applicant: SUMITOMO RUBBER INDUSTRIES, LTD., Kobe (JP)

(72) Inventor: Tsuyoshi Tsuchida, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 34 days.

(21) Appl. No.: 16/478,797

(22) PCT Filed: Jan. 29, 2018

(86) PCT No.: PCT/JP2018/002609
§ 371 (c)(1),
(2) Date: Jul. 17, 2019

(87) PCT Pub. No.: WO2018/143111
PCT Pub. Date: Aug. 9, 2018

(65) Prior Publication Data
US 2019/0375920 A1    Dec. 12, 2019

(30) Foreign Application Priority Data
Feb. 2, 2017 (JP) .............................. JP2017-017713

(51) Int. Cl.
*C08L 9/06* (2006.01)
*B60C 1/00* (2006.01)
*B60C 11/00* (2006.01)

(52) U.S. Cl.
CPC .............. *C08L 9/06* (2013.01); *B60C 1/0016* (2013.01); *B60C 11/0008* (2013.01); *B60C 2011/0025* (2013.01); *C08L 2205/025* (2013.01); *C08L 2205/03* (2013.01)

(58) Field of Classification Search
CPC .. C08L 9/06; C08L 2205/025; C08L 2205/03; B60C 1/0016; B60C 11/0008; B60C 2011/0025; C08K 3/06; C08K 5/54; C08K 5/548
USPC ....................................................... 524/526
See application file for complete search history.

(56) References Cited

U.S. PATENT DOCUMENTS

| | | | |
|---|---|---|---|
| 5,580,919 A | 12/1996 | Agostini et al. |
| 5,994,448 A | 11/1999 | Blok et al. |
| 6,053,226 A | 4/2000 | Agostini |
| 6,326,424 B1 | 12/2001 | Louis et al. |

FOREIGN PATENT DOCUMENTS

| | | | |
|---|---|---|---|
| EP | 0764688 A1 | | 3/1997 |
| EP | 0979841 A1 | | 2/2000 |
| EP | 0994149 A1 | | 4/2000 |
| JP | 8-259739 A | | 10/1996 |
| JP | 2001-226532 A | | 8/2001 |
| JP | 2001226532 A | * | 8/2001 |
| JP | 4266248 B2 | | 5/2009 |
| JP | 2013-249359 A | | 12/2013 |
| JP | 2013249359 A | * | 12/2013 |

OTHER PUBLICATIONS

English machine translation for JP-2001-226532-A dated Aug. 21, 2001.
English machine translation for JP-2013-249359-A dated Dec. 12, 2013.
International Search Report for PCT/JP2018/002609 (PCT/ISA/210) dated Apr. 17, 2018.
Written Opinion of the International Searching Authority for PCT/JP2018/002609 (PCT/ISA/237) dated Apr. 17, 2018.

* cited by examiner

*Primary Examiner* — Ling Siu Choi
*Assistant Examiner* — Ronald Grinsted
(74) *Attorney, Agent, or Firm* — Birch, Stewart, Kolasch & Birch, LLP

(57) ABSTRACT

The present invention provides a rubber composition for tires which provides significantly improved abrasion resistance while maintaining fuel economy, and a pneumatic tire including the rubber composition. The present invention relates to a rubber composition for tires including: a silane coupling agent containing an alkoxysilyl group and a sulfur atom, the alkoxysilyl group being linked to the sulfur atom by six or more carbon atoms; and sulfur, the rubber composition including, per 100 parts by mass of the rubber component therein, 1.5 parts by mass or less of the sulfur.

3 Claims, No Drawings

RUBBER COMPOSITION FOR TIRES, AND PNEUMATIC TIRES

TECHNICAL FIELD

The present invention relates to a rubber composition for tires and a pneumatic tire including the rubber composition.

BACKGROUND ART

Recently, because of environmental concerns, it has become desirable to provide tire rubber materials with improved properties such as fuel economy and abrasion resistance. For example, contemplated techniques for improving the properties include using silica and a silane coupling agent to enhance silica dispersibility. In particular, formulations containing silica and bis(3-triethoxysilylpropyl)-tetrasulfide have been proposed (Patent Literature 1).

Nevertheless, to meet the demanding requirements for improved properties, it is desirable to further improve fuel economy and abrasion resistance.

CITATION LIST

Patent Literature

Patent Literature 1: JP 4266248 B

SUMMARY OF INVENTION

Technical Problem

The present invention aims to solve the problems and provide a rubber composition for tires which provides significantly improved abrasion resistance while maintaining fuel economy, and a pneumatic tire including the rubber composition.

Solution to Problem

The present invention relates to a rubber composition for tires, including: a silane coupling agent containing an alkoxysilyl group and a sulfur atom, the alkoxysilyl group being linked to the sulfur atom by six or more carbon atoms; and sulfur, the rubber composition including, per 100 parts by mass of a rubber component therein, 1.5 parts by mass or less of the sulfur.

Preferably, the rubber composition includes, per 100 parts by mass of the rubber component, 100 parts by mass of silica and 0.5 to 25 parts by mass of the silane coupling agent.

The present invention is also directed to a pneumatic tire, formed from the rubber composition.

Advantageous Effects of Invention

The rubber composition for tires of the present invention contains a specific silane coupling agent and a predetermined amount of sulfur. Such a rubber composition provides significantly improved abrasion resistance while maintaining fuel economy.

DESCRIPTION OF EMBODIMENTS

The rubber composition for tires of the present invention includes: a silane coupling agent containing an alkoxysilyl group and a sulfur atom in which the alkoxysilyl group is linked to the sulfur atom by six or more carbon atoms; and sulfur. The amount of the sulfur is not more than a predetermined amount.

The present invention significantly (synergistically) improves abrasion resistance while maintaining fuel economy. The mechanism of this effect can be explained as follows.

Particularly when a silane coupling agent in which an alkoxysilyl group is linked to a sulfur atom by a long linker (hereinafter, also referred to as spacer) is used, the length of a bond between the silane coupling agent and silica will be longer than that obtained when usual silane coupling agents are used. Thus, it is believed that this longer bond can receive stress around the silica in the same manner as a spring and thereby relieve stress on the rubber, which makes it possible to significantly improve abrasion resistance while maintaining fuel economy, as compared to common silane coupling agents.

The specific silane coupling agent having a long spacer according to the present application is also effective in enhancing hardness and processability, as well as improving abrasion resistance. Since the target hardness depends on the intended component, it is necessary to control the hardness. The hardness can be controlled (reduced) by various techniques, such as increasing the amount of oil, reducing the amount of sulfur, or increasing the number of kneadings. However, only when the specific silane coupling agent according to the present application is used, particularly while reducing the amount of sulfur, greatly enhanced abrasion resistance can be achieved. This is probably because reducing the amount of sulfur reduces stress concentration on the crosslinked portion.

It is thus believed that by using the specific silane coupling agent according to the present application while reducing the amount of sulfur, the abrasion resistance enhancing effect of the silane coupling agent itself and the abrasion resistance enhancing effect due to uniform crosslinking achieved by reducing the amount of sulfur can be synergistically achieved. Further, owing to the rolling resistance-reducing effect of the silane coupling agent, good fuel economy can also be ensured. For these reasons, it is believed that the present invention has the effect of synergistically improving abrasion resistance while maintaining excellent fuel economy.

The rubber composition includes a silane coupling agent containing an alkoxysilyl group and a sulfur atom in which the alkoxysilyl group is linked to the sulfur atom by six or more carbon atoms.

The silane coupling agent may be, for example, an organosilicon compound having a ratio of the number of sulfur atoms to the number of silicon atoms of 1.0 to 1.5 as represented by the following average compositional formula (I):

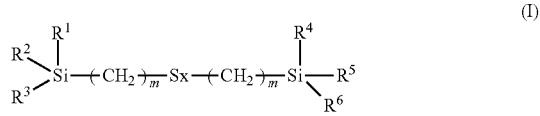

wherein x represents the average number of sulfur atoms; m represents an integer of 6 to 12; and $R^1$ to $R^6$ are the same or different and each represent a C1-C6 alkyl or alkoxy group, at least one of $R^1$ to $R^3$ and at least one of $R^4$ to $R^6$ are the alkoxy groups, provided that the alkyl or alkoxy groups for $R^1$ to $R^6$ may be joined to form a ring structure.

The present inventor has found that when the organosilicon compound of formula (I) is used as a silane coupling agent in an inorganic filler-containing rubber composition, the rubber composition provides good fuel economy (less heat build-up) and further achieves a balanced improvement of processability, which is a shortcoming of silica-containing formulations, and abrasion resistance, which is a trade-off with fuel economy.

The reason for this effect is not absolutely clear but seems to be as follows.

Organosilicon compounds (silane coupling agents) crosslink silica to rubber. Particularly when the compound of formula (I) having 6 to 12 carbon atoms between sulfur and silicon atoms is used as a silane coupling agent, the length of the bond between silica and rubber will be longer than that obtained when usual silane coupling agents are used. Thus, it is considered that a certain degree of flexibility is imparted to the crosslinked portion, thereby facilitating relaxation of external stress which can cause rubber fracture. For this reason, it is believed that the abrasion resistance is improved as compared to common silane coupling agents. It is also believed that when the number of carbon atoms between silicon and sulfur is increased as compared to common silane coupling agents, the rate of silanization will be slightly reduced, so that excessive bonding between silica and rubber can be suppressed during kneading, resulting in good processability as well. Therefore, abrasion resistance is significantly improved while maintaining good fuel economy. Further, good processability is also obtained, so that a balanced improvement of these properties can be achieved.

The symbol x represents the average number of sulfur atoms in the organosilicon compound. This means that the organosilicon compound of average compositional formula (I) is a mixture of compounds having different sulfur numbers, and x is the average number of sulfur atoms of the organosilicon compounds contained in the rubber composition. The symbol x is defined as {2×(number of sulfur atoms)}/(number of silicon atoms). In view of fuel economy and abrasion resistance, x is preferably 2.0 to 2.4, more preferably 2.0 to 2.3. In particular, when x is less than the upper limit, an increase in the Mooney viscosity of the unvulcanized rubber can be reduced, resulting in good processability. The number of sulfur atoms and the number of silicon atoms are determined by measuring the amount of sulfur or silicon in the composition by X-ray fluorescence analysis, followed by calculation based on their molecular weight.

The symbol m represents an integer of 6 to 12, preferably 6 to 10, more preferably 8. In this case, the above-described effect can be achieved, and the effect of the present invention can be sufficiently achieved.

In view of fuel economy and abrasion resistance, the alkyl group ($R^1$ to $R^6$) preferably has 1 to 6 carbon atoms, more preferably 1 to 4 carbon atoms. The alkyl group may be linear, branched, or cyclic. Specific examples include methyl, ethyl, n-propyl, isopropyl, n-butyl, iso-butyl, sec-butyl, and tert-butyl groups.

In view of fuel economy and abrasion resistance, the alkoxy group ($R^1$ to $R^6$) preferably has 1 to 6 carbon atoms, more preferably 1 to 4 carbon atoms. The hydrocarbon group in the alkoxy group may be linear, branched, or cyclic. Specific examples include methoxy, ethoxy, n-propoxy, isopropoxy, and n-butoxy groups.

At least one of $R^1$ to $R^3$ and at least one of $R^4$ to $R^6$ are C1-C6 alkoxy groups. Preferably two or more of $R^1$ to $R^3$ and two or more of $R^4$ to $R^6$ are alkoxy groups.

The C1-C6 alkyl or alkoxy groups for $R^1$ to $R^6$ may be joined to form a ring structure. For example, (i) when an ethoxy group as $R^1$ is joined to a methyl group as $R^2$ to form a ring structure, and (ii) when an ethyl group as $R^1$ is joined to a methyl group as $R^2$ to form a ring structure, $R^1$ and $R^2$ form the divalent groups: —O—$C_2H_4$—$CH_2$— and —$C_2H_4$—$CH_2$—, respectively, which are bound to Si.

The organosilicon compound has a ratio of the number of sulfur atoms to the number of silicon atoms of 1.0 to 1.5. In other words, the ratio of the total number of sulfur atoms to the total number of silicon atoms of the organosilicon compounds of average compositional formula (I) contained in the rubber composition falls within the range indicated above.

In view of fuel economy and abrasion resistance, the ratio of the number of sulfur atoms to the number of silicon atoms is preferably 1.0 to 1.2, more preferably 1.0 to 1.15.

The organosilicon compound of average compositional formula (I) having a ratio of the number of sulfur atoms to the number of silicon atoms within the predetermined range may be prepared, for example, as follows.

The organosilicon compound can be produced by reacting a halogen-containing organosilicon compound represented by the following formula (I-1):

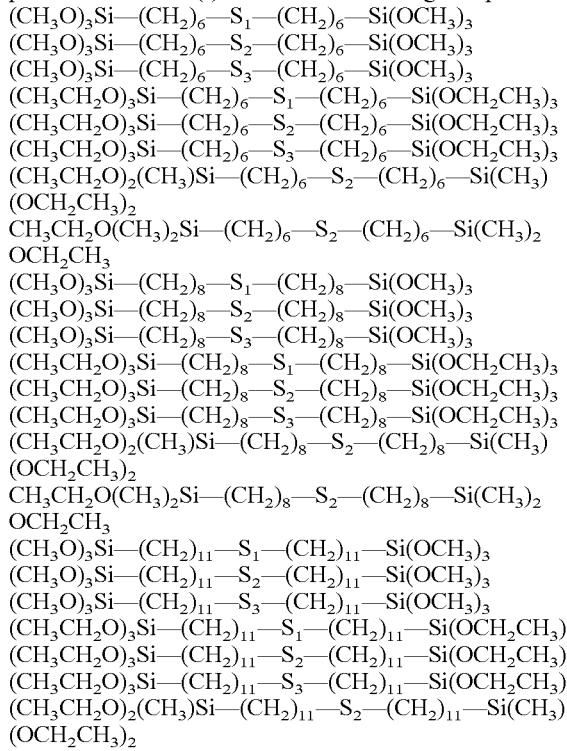

(I-1)

wherein $R^1$ to $R^3$ and m are as defined above, and X represents a halogen atom, with anhydrous sodium sulfide represented by $Na_2S$ and optionally sulfur.

Examples of X (halogen atom) include Cl, Br, and I.

Examples of the silane coupling agent such as the sulfide chain-containing organosilicon compound of average compositional formula (I) include the following compounds:
$(CH_3O)_3Si$—$(CH_2)_6$—$S_1$—$(CH_2)_6$—$Si(OCH_3)_3$
$(CH_3O)_3Si$—$(CH_2)_6$—$S_2$—$(CH_2)_6$—$Si(OCH_3)_3$
$(CH_3O)_3Si$—$(CH_2)_6$—$S_3$—$(CH_2)_6$—$Si(OCH_3)_3$
$(CH_3CH_2O)_3Si$—$(CH_2)_6$—$S_1$—$(CH_2)_6$—$Si(OCH_2CH_3)_3$
$(CH_3CH_2O)_3Si$—$(CH_2)_6$—$S_2$—$(CH_2)_6$—$Si(OCH_2CH_3)_3$
$(CH_3CH_2O)_3Si$—$(CH_2)_6$—$S_3$—$(CH_2)_6$—$Si(OCH_2CH_3)_3$
$(CH_3CH_2O)_2(CH_3)Si$—$(CH_2)_6$—$S_2$—$(CH_2)_6$—$Si(CH_3)(OCH_2CH_3)_2$
$CH_3CH_2O(CH_3)_2Si$—$(CH_2)_6$—$S_2$—$(CH_2)_6$—$Si(CH_3)_2OCH_2CH_3$
$(CH_3O)_3Si$—$(CH_2)_8$—$S_1$—$(CH_2)_8$—$Si(OCH_3)_3$
$(CH_3O)_3Si$—$(CH_2)_8$—$S_2$—$(CH_2)_8$—$Si(OCH_3)_3$
$(CH_3O)_3Si$—$(CH_2)_8$—$S_3$—$(CH_2)_8$—$Si(OCH_3)_3$
$(CH_3CH_2O)_3Si$—$(CH_2)_8$—$S_1$—$(CH_2)_8$—$Si(OCH_2CH_3)_3$
$(CH_3CH_2O)_3Si$—$(CH_2)_8$—$S_2$—$(CH_2)_8$—$Si(OCH_2CH_3)_3$
$(CH_3CH_2O)_3Si$—$(CH_2)_8$—$S_3$—$(CH_2)_8$—$Si(OCH_2CH_3)_3$
$(CH_3CH_2O)_2(CH_3)Si$—$(CH_2)_8$—$S_2$—$(CH_2)_8$—$Si(CH_3)(OCH_2CH_3)_2$
$CH_3CH_2O(CH_3)_2Si$—$(CH_2)_8$—$S_2$—$(CH_2)_8$—$Si(CH_3)_2OCH_2CH_3$
$(CH_3O)_3Si$—$(CH_2)_{11}$—$S_1$—$(CH_2)_{11}$—$Si(OCH_3)_3$
$(CH_3O)_3Si$—$(CH_2)_{11}$—$S_2$—$(CH_2)_{11}$—$Si(OCH_3)_3$
$(CH_3O)_3Si$—$(CH_2)_{11}$—$S_3$—$(CH_2)_{11}$—$Si(OCH_3)_3$
$(CH_3CH_2O)_3Si$—$(CH_2)_{11}$—$S_1$—$(CH_2)_{11}$—$Si(OCH_2CH_3)_3$
$(CH_3CH_2O)_3Si$—$(CH_2)_{11}$—$S_2$—$(CH_2)_{11}$—$Si(OCH_2CH_3)_3$
$(CH_3CH_2O)_3Si$—$(CH_2)_{11}$—$S_3$—$(CH_2)_{11}$—$Si(OCH_2CH_3)_3$
$(CH_3CH_2O)_2(CH_3)Si$—$(CH_2)_{11}$—$S_2$—$(CH_2)_{11}$—$Si(CH_3)(OCH_2CH_3)_2$ CH$_3$CH$_2$O(CH$_3$)$_2$Si—(CH$_2$)$_{11}$—S$_2$—(CH$_2$)$_{11}$—Si(CH$_3$)$_2$OCH$_2$CH$_3$ Examples of the halogen-containing organosilicon compound of formula (I-1) include the following compounds:
(CH$_3$O)$_3$Si—(CH$_2$)$_6$—Cl
(CH$_3$O)$_3$Si—(CH$_2$)$_6$—Br
(CH$_3$CH$_2$O)$_3$Si—(CH$_2$)$_6$—Cl
(CH$_3$CH$_2$O)$_3$Si—(CH$_2$)$_6$—Br
(CH$_3$CH$_2$O)$_2$(CH$_3$)Si—(CH$_2$)$_6$—Cl
CH$_3$CH$_2$O(CH$_3$)$_2$Si—(CH$_2$)$_6$—Cl
(CH$_3$O)$_3$Si—(CH$_2$)$_8$—Cl
(CH$_3$O)$_3$Si—(CH$_2$)$_8$—Br
(CH$_3$CH$_2$O)$_3$Si—(CH$_2$)$_8$—Cl
(CH$_3$CH$_2$O)$_3$Si—(CH$_2$)$_8$—Br
(CH$_3$CH$_2$O)$_2$(CH$_3$)Si—(CH$_2$)$_8$—Cl
CH$_3$CH$_2$O(CH$_3$)$_2$Si—(CH$_2$)$_8$—Cl
(CH$_3$O)$_3$Si—(CH$_2$)$_{11}$—Cl
(CH$_3$O)$_3$Si—(CH$_2$)$_{11}$—Br
(CH$_3$CH$_2$O)$_3$Si—(CH$_2$)$_{11}$—Cl
(CH$_3$CH$_2$O)$_3$Si—(CH$_2$)$_{11}$—Br
(CH$_3$CH$_2$O)$_2$(CH$_3$)Si—(CH$_2$)$_{11}$—Cl
CH$_3$CH$_2$O(CH$_3$)$_2$Si—(CH$_2$)$_{11}$—Cl In the reaction, sulfur may optionally be added to control the sulfide chain. The addition amount may be selected depending on the amounts of the compound of formula (I-1) and anhydrous sodium sulfide in order to give the desired compound of average compositional formula (I).

For example, when it is desired to produce a compound of average compositional formula (I) wherein x is 2.2, it is sufficient to react 1.0 mol of anhydrous sodium sulfide, 1.2 mol of sulfur, and 2.0 mol of the compound of formula (I-1).

The reaction may be carried out in a solvent or under solvent-free conditions. Examples of usable solvents include aliphatic hydrocarbons such as pentane and hexane; aromatic hydrocarbons such as benzene, toluene, and xylene; ethers such as tetrahydrofuran, diethyl ether, and dibutyl ether; and alcohols such as methanol and ethanol. The reaction is preferably carried out in an ether such as tetrahydrofuran or an alcohol such as methanol or ethanol, among others.

The temperature during the reaction is not particularly limited and may be from room temperature to about 200° C., in particular preferably 60 to 170° C., more preferably 60 to 100° C. The duration of the reaction is 30 minutes or longer, and the reaction will be completed in about 2 to 15 hours.

In the present invention, the solvent, if used, may be evaporated under reduced pressure before or after the salts formed are removed by filtration after completion of the reaction.

The silane coupling agent may be a commercial product of, for example, Degussa, Momentive, Shin-Etsu Silicone, Tokyo Chemical Industry Co., Ltd., AZmax. Co., or Dow Corning Toray Co., Ltd.

The amount of the silane coupling agent per 100 parts by mass of silica is preferably 0.5 parts by mass or more, more preferably 3 parts by mass or more, still more preferably 6 parts by mass or more. When the amount is 0.5 parts by mass or more, chemical bonding between rubber and silica via the silane coupling agent can be sufficiently produced, so that good silica dispersion can be obtained, resulting in improved fuel economy and abrasion resistance. The amount of the silane coupling agent is preferably 25 parts by mass or less, more preferably 20 parts by mass or less, still more preferably 15 parts by mass or less. When the amount is 25 parts by mass or less, good processability can be ensured.

The rubber composition contains a predetermined amount of sulfur (sulfur crosslinking agent).

Examples of the sulfur serving as a crosslinking agent include those usually used in the rubber industry, such as powdered sulfur, precipitated sulfur, colloidal sulfur, insoluble sulfur, highly dispersible sulfur, and soluble sulfur. These may be used alone, or two or more of these may be used in combination.

The sulfur may be a commercial product of, for example, Tsurumi Chemical Industry Co., Ltd., Karuizawa sulfur Co., Ltd., Shikoku Chemicals Corporation, Flexsys, Nippon Kanryu Industry Co., Ltd., or Hosoi Chemical Industry Co., Ltd.

The amount of the sulfur per 100 parts by mass of the rubber component is 1.5 parts by mass or less, preferably 1.3 parts by mass or less, more preferably 1.2 parts by mass or less. When the amount is 1.5 parts by mass or less, abrasion resistance can be improved. Moreover, the lower limit of the amount of the sulfur is preferably 0.3 parts by mass or more, more preferably 0.5 parts by mass or more. When the amount is not less than the lower limit, a predetermined hardness can be obtained, and various rubber physical properties can be ensured.

Examples of materials that can be used as the rubber component in the rubber composition include diene rubbers such as isoprene-based rubbers, polybutadiene rubber (BR), styrene butadiene rubber (SBR), and styrene isoprene butadiene rubber (SIBR); chloroprene rubber (CR), acrylonitrile butadiene rubber (NBR), and butyl rubber (IIR). Examples of the isoprene-based rubbers include natural rubber (NR), polyisoprene rubber (IR), refined NR (e.g., deproteinized natural rubber (DPNR), highly purified natural rubber (UPNR)), modified NR (e.g., epoxidized natural rubber (ENR), hydrogenated natural rubber (HNR), grafted natural rubber), and modified IR (e.g., epoxidized polyisoprene rubber, hydrogenated polyisoprene rubber, grafted polyisoprene rubber). These rubbers may be used alone, or two or more of these may be used in combination. To achieve the effect of the present invention well, SBR, isoprene-based rubbers, and BR are preferred among these, with SBR and/or BR being more preferred.

Any SBR may be used, including emulsion-polymerized SBR (E-SBR) and solution-polymerized SBR (S-SBR). Any BR may be used, including high-cis 1,4 polybutadiene rubber (high-cis BR), polybutadiene rubber containing 1,2-syndiotactic polybutadiene crystals (SPB-containing BR), and BR synthesized using rare earth catalysts (rare earth-catalyzed BR). The SBR and BR may be modified SBR and modified BR, respectively, in which either the main chain or chain end(s) or both may be modified. Examples of modifying groups include nitrogen-containing groups interactive or reactive with silica.

The SBR may be a solution-polymerized SBR manufactured or sold by, for example, Sumitomo Chemical Co., Ltd., JSR Corporation, Asahi Kasei Corporation, or Zeon Corporation.

The amount of the SBR based on 100% by mass of the rubber component is preferably 20% by mass or more, more preferably 50% by mass or more, still more preferably 60% by mass or more. When the amount is 20% by mass or more, good abrasion resistance tends to be obtained. The amount is preferably 95% by mass or less, more preferably 90% by mass or less. When the amount is 95% by mass or less, good low heat build-up properties tend to be achieved.

The BR may be a commercial product of, for example, Ube Industries, Ltd., JSR Corporation, Asahi Kasei Corporation, or Zeon Corporation.

The amount of the BR based on 100% by mass of the rubber component is preferably 5% by mass or more, more preferably 10% by mass or more. When the amount is 5% by mass or more, good abrasion resistance tends to be obtained. The amount is preferably 50% by mass or less, more preferably 30% by mass or less. When the amount is 50% by mass or less, good grip performance tends to be obtained.

To obtain good fuel economy and good abrasion resistance, the rubber composition preferably contains silica. Examples of the silica include dry silica (anhydrous silica) and wet silica (hydrous silica). Wet silica is preferred because it contains a large number of silanol groups.

The silica may be a commercial product of, for example, Degussa, Rhodia, Tosoh Silica Corporation, Solvay Japan, or Tokuyama Corporation.

The silica preferably has a nitrogen adsorption specific surface area ($N_2SA$) of 70 $m^2/g$ or more, more preferably 150 $m^2/g$ or more. When the $N_2SA$ is 70 $m^2/g$ or more, abrasion resistance and other properties tend to be enhanced. The $N_2SA$ of the silica is preferably 500 $m^2/g$ or less, more preferably 200 $m^2/g$ or less. When the $N_2SA$ is 500 $m^2/g$ or less, processability tends to be improved.

The nitrogen adsorption specific surface area of the silica is determined by the BET method in accordance with ASTM D3037-81.

The amount of the silica per 100 parts by mass of the rubber component is preferably 5 parts by mass or more, more preferably 30 parts by mass or more, still more preferably 60 parts by mass or more. When the amount is 5 parts by mass or more, fuel economy and other properties tend to be improved. The amount is preferably 200 parts by mass or less, more preferably 150 parts by mass or less, still more preferably 130 parts by mass or less. When the amount is more than 200 parts by mass, processability and fuel economy tend to be less balanced.

The rubber composition may contain additional inorganic fillers other than silica, such as calcium carbonate, calcium silicate, magnesium oxide, aluminum oxide, alumina, alumina hydrate, aluminum hydroxide, magnesium hydroxide, magnesium oxide, barium sulfate, talc, and mica. The total amount of inorganic fillers including silica and additional inorganic fillers may suitably be within the range indicated above.

In view of abrasion resistance and other properties, the rubber composition preferably contains carbon black. Examples of the carbon black include carbon black of grades N110, N220, N330, and N550.

The carbon black may be a commercial product of, for example, Asahi Carbon Co., Ltd., Cabot Japan K. K., Tokai Carbon Co., Ltd., Mitsubishi Chemical Corporation, Lion Corporation, NSCC Carbon Co., Ltd., or Columbia Carbon.

The carbon black preferably has a nitrogen adsorption specific surface area ($N_2SA$) of 70 $m^2/g$ or more, more preferably 90 $m^2/g$ or more. The $N_2SA$ is preferably 150 $m^2/g$ or less, more preferably 130 $m^2/g$ or less. When the $N_2SA$ is not less than the lower limit, good abrasion resistance tends to be obtained. When the $N_2SA$ is not more than the upper limit, good dispersion of carbon black tends to be achieved, resulting in excellent fuel economy.

The $N_2SA$ of the carbon black can be determined in accordance with JIS K 6217-2:2001.

The amount of the carbon black per 100 parts by mass of the rubber component is preferably 1 part by mass or more, more preferably 3 parts by mass or more. The amount is also preferably 15 parts by mass or less, more preferably 10 parts by mass or less, still more preferably 8 parts by mass or less. When the amount is 1 part by mass or more, good abrasion resistance tends to be obtained. When the amount is 15 parts by mass or less, good fuel economy tends to be obtained.

The rubber composition preferably contains a solid resin (a resin that is solid at room temperature (25° C.)). Examples of the solid resin include aromatic vinyl polymers such as α-methylstyrene resins produced by polymerizing α-methylstyrene and/or styrene. The solid resin preferably has a softening point of 60 to 120° C. The softening point of the solid resin is determined in accordance with JIS K 6220-1: 2001 using a ring and ball softening point measuring apparatus and defined as the temperature at which the ball drops down.

Preferred examples of the α-methylstyrene resins include homopolymers of α-methylstyrene or styrene and copolymers of α-methylstyrene and styrene, with copolymers of α-methylstyrene and styrene being more preferred.

The amount of the solid resin per 100 parts by mass of the rubber component is preferably 3 to 30 parts by mass, more preferably 5 to 20 parts by mass. Incorporation of such a predetermined amount of the solid resin tends to enhance abrasion resistance and other properties.

The solid resin may be a commercial product of, for example, Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., or Taoka Chemical Co., Ltd.

The rubber composition preferably contains an oil.

Examples of the oil include process oils, vegetable fats and oils, and mixtures thereof. Examples of the process oils include paraffinic process oils, aromatic process oils, and naphthenic process oils. Examples of the vegetable fats and oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, *Camellia* oil, jojoba oil, macadamia nut oil, and tung oil. Process oils are preferred among these.

The oil may be a commercial product of, for example, Idemitsu Kosan Co., Ltd., Sankyo Yuka Kogyo K.K., Japan Energy Corporation, Olisoy, H&R, Hokoku Corporation, Showa Shell Sekiyu K.K., or Fuji Kosan Co., Ltd.

The amount of the oil per 100 parts by mass of the rubber component is preferably 1 part by mass or more, more preferably 3 parts by mass or more. The amount is also preferably 50 parts by mass or less, more preferably 30 parts by mass or less. When the amount is within the numerical range indicated above, the effect of the present invention tends to be better achieved.

The amount of the oil includes the oil contained in the rubber (oil extended rubber).

The rubber composition preferably contains a wax.

Non-limiting examples of the wax include petroleum waxes such as paraffin waxes and microcrystalline waxes; naturally-occurring waxes such as plant waxes and animal waxes; and synthetic waxes such as polymers of ethylene, propylene, or other monomers. To better achieve the effect of the present invention, petroleum waxes are preferred, with paraffin waxes being more preferred.

The wax may be a commercial product of, for example, Ouchi Shinko Chemical Industrial Co., Ltd., Nippon Seiro Co., Ltd., or Seiko Chemical Co., Ltd.

The amount of the wax per 100 parts by mass of the rubber component is preferably 1.0 part by mass or more, more preferably 1.5 parts by mass or more. The amount is also preferably 10 parts by mass or less, more preferably 7 parts by mass or less. When the amount is within the numerical range indicated above, the effect of the present invention tends to be well achieved.

The rubber composition preferably contains an antioxidant.

Examples of the antioxidant include: naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl)-propionate]methane. Among these, p-phenylenediamine antioxidants are preferred, with N-(1,3-dimethylbutyl)-W-phenyl-p-phenylenediamine being more preferred.

The antioxidant may be a commercial product of, for example, Seiko Chemical Co., Ltd., Sumitomo Chemical Co., Ltd., Ouchi Shinko Chemical Industrial Co., Ltd., or Flexsys.

The amount of the antioxidant per 100 parts by mass of the rubber component is preferably 1 part by mass or more, more preferably 3 parts by mass or more. The amount is also preferably 10 parts by mass or less, more preferably 7 parts by mass or less. When the amount is within the numerical range indicated above, the effect of the present invention tends to be well achieved.

The rubber composition preferably contains stearic acid.

The stearic acid may be a conventional one, for example, a commercial product of NOF Corporation, NOF Corporation, Kao Corporation, Wako Pure Chemical Industries, Ltd., or Chiba Fatty Acid Co., Ltd.

The amount of the stearic acid per 100 parts by mass of the rubber component is preferably 0.5 parts by mass or more, more preferably 1 part by mass or more. The amount is also preferably 10 parts by mass or less, more preferably 5 parts by mass or less. When the amount is within the numerical range indicated above, the effect of the present invention tends to be well achieved.

The rubber composition preferably contains zinc oxide.

The zinc oxide may be a conventional one, for example, a commercial product of Mitsui Mining & Smelting Co., Ltd., Toho Zinc Co., Ltd., HakusuiTech Co., Ltd., Seido Chemical Industry Co., Ltd., or Sakai Chemical Industry Co., Ltd.

The amount of the zinc oxide per 100 parts by mass of the rubber component is preferably 0.5 parts by mass or more, more preferably 1 part by mass or more. The amount is also preferably 10 parts by mass or less, more preferably 5 parts by mass or less. When the amount is within the numerical range indicated above, the effect of the present invention tends to be better achieved.

The rubber composition preferably contains a vulcanization accelerator.

Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. To more suitably achieve the effect of the present invention, sulfenamide and/or guanidine vulcanization accelerators are preferred among these.

The vulcanization accelerator may be a commercial product of, for example, Ouchi Shinko Chemical Industrial Co., Ltd. or Sanshin Chemical Industry Co., Ltd.

The amount of the vulcanization accelerator per 100 parts by mass of the rubber component is preferably 1 part by mass or more, more preferably 3 parts by mass or more. The amount is also preferably 10 parts by mass or less, more preferably 7 parts by mass or less. When the amount is within the numerical range indicated above, the effect of the present invention tends to be well achieved.

In addition to the above-mentioned components, the rubber composition may contain additives usually used in the tire industry. Examples include organic peroxides; and processing aids such as plasticizers and lubricants.

The rubber composition of the present invention may be prepared by known methods. For example, the rubber composition may be prepared by kneading the above-mentioned components using a rubber kneading machine such as an open roll mill or a Banbury mixer and vulcanizing the kneaded mixture. In particular, since the specific silane coupling agent having a long spacer according to the present application reacts slowly with silica, it is considered that long time kneading allows the reaction between the silane coupling agent and silica to proceed sufficiently to increase organification of silica so that silica dispersibility can be further enhanced. Therefore, the rubber composition has the effect of enhancing not only abrasion resistance, but also fuel economy and processability, resulting in a general improvement in the balance of these properties.

The rubber composition of the present invention can be suitably used in tire components such as: sidewalls, treads (cap treads), base treads, undertreads, clinch apexes, bead apexes, breaker cushion rubbers, carcass cord topping rubbers, insulations, chafers, and innerliners; and side reinforcing layers of run-flat tires. The rubber composition can be suitably used in treads (cap treads), among others, because of its good fuel economy and abrasion resistance.

The pneumatic tire of the present invention can be produced using the rubber composition by usual methods. Specifically, the unvulcanized rubber composition containing various additives as needed may be extruded into the shape of a tire component such as a tread, and then formed and assembled with other tire components in a conventional manner on a tire building machine to build an unvulcanized tire, followed by heating and pressing in a vulcanizer to produce a tire.

The tire of the present invention is suitable for use as, for example, a tire for passenger vehicles, buses, trucks, or two-wheeled vehicles, a high performance tire, or a racing tire.

EXAMPLES

The chemicals used in the examples and comparative examples are listed below.
NR: TSR
SBR: unmodified solution-polymerized SBR (extender oil content: 37 parts by mass/100 parts by mass of rubber, styrene content: 40 parts by mass, vinyl content: 25% by mass, Mw: 1,200,000)

BR: unmodified solution-polymerized BR (cis content: 96% by mass, vinyl content: 2% by mass)
Silica: $N_2SA$ 175 $m^2/g$
Carbon black N220: $N_2SA$ 111 $m^2/g$
Silane coupling agent 1: the silane coupling agent synthesized in Production Example 1 below
Silane coupling agent 2: Si266 available from Evonik Degussa (a compound of the following formula wherein x=2.2)

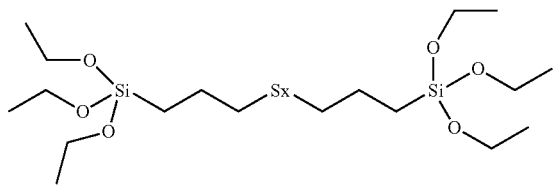

Silane coupling agent 3: the silane coupling agent synthesized in Production Example 2 below
Silane coupling agent 4: the silane coupling agent synthesized in Production Example 3 below
Silane coupling agent 5: the silane coupling agent synthesized in Production Example 4 below
Oil: paraffinic process oil
Resin: α-methylstyrene resin (a copolymer of α-methylstyrene and styrene, softening point: 85° C., Tg: 43° C.)
Zinc oxide: zinc oxide #1 available from Mitsui Mining & Smelting Co., Ltd.
Stearic acid: stearic acid "TSUBAKI" available from NOF Corporation
Wax: paraffinic wax
Antioxidant: N-(1,3-dimethylbutyl)-N'-phenyl-p-phenylenediamine
Sulfur: powdered sulfur available from Tsurumi Chemical Industry Co., Ltd.
Vulcanization accelerator 1: N-tert-butyl-2-benzothiazolylsulfenamide
Vulcanization accelerator 2: diphenylguanidine (Production Example 1: Synthesis of Silane Coupling Agent 1 (x=2.2, m=8, $R^1$ to $R^6$=$OCH_2CH_3$))

A 2 L separable flask equipped with a stirrer, a reflux condenser, a dropping funnel, and a thermometer was charged with 78.0 g (1.0 mol) of anhydrous sodium sulfide, 38.5 g (1.2 mol) of sulfur, and 480 g of ethanol, followed by heating to 80° C. To the resulting mixture was dropwise added 622 g (2.0 mol) of 8-chlorooctyltriethoxysilane, followed by heating with stirring at 80° C. for 10 hours. The reaction solution was filtered under pressure through a filter plate to obtain a filtrate from which the salts formed through the reaction were removed. The filtrate was heated to 100° C., and the ethanol was evaporated under a reduced pressure of 10 mmHg or lower to obtain silane coupling agent 1 as a reaction product.
The silane coupling agent 1 compound had a sulfur content of 10.8% by mass (0.34 mol), a silicon content of 8.7% by mass (0.31 mol), and a ratio of the number of sulfur atoms to the number of silicon atoms of 1.1.

(Production Example 2: Synthesis of Silane Coupling Agent 3 (x=2.0, m=8, $R^1$ to $R^6$=$OCH_2CH_3$))

Silane coupling agent 3 was prepared as a reaction product by the same synthesis procedure as in Production Example 1, except that the amount of sulfur was changed to 32.1 g (1.0 mol).

The silane coupling agent 3 compound had a sulfur content of 10.0% by mass (0.31 mol), a silicon content of 8.8% by mass (0.31 mol), and a ratio of the number of sulfur atoms to the number of silicon atoms of 1.0.

(Production Example 3: Synthesis of Silane Coupling Agent 4 (x=2.4, m=8, $R^1$ to $R^6$=$OCH_2CH_3$))

Silane coupling agent 4 was prepared as a reaction product by the same synthesis procedure as in Production Example 1, except that the amount of sulfur was changed to 45.0 g (1.4 mol).
The silane coupling agent 4 compound had a sulfur content of 11.9% by mass (0.37 mol), a silicon content of 8.7% by mass (0.31 mol), and a ratio of the number of sulfur atoms to the number of silicon atoms of 1.2.

(Production Example 4: Synthesis of Silane Coupling Agent 5 (x=2.2, m=8, $R^1$, $R^2$, $R^4$, $R^5$=$OCH_2CH_3$, $R^3$, $R^6$=$CH_3$))

Silane coupling agent 5 was prepared as a reaction product by the same synthesis procedure as in Production Example 1, except that 562 g (2.0 mol) of 8-chlorooctyldiethoxymethylsilane was used instead of 8-chlorooctyltriethoxysilane.
The silane coupling agent 5 compound had a sulfur content of 11.0% by mass (0.34 mol), a silicon content of 8.7% by mass (0.31 mol), and a ratio of the number of sulfur atoms to the number of silicon atoms of 1.1.

Examples and Comparative Examples (First Step)
According to each formulation shown in Table 1 or 2, the materials other than the sulfur and vulcanization accelerators were introduced and kneaded in a Banbury mixer to prepare a first kneaded mixture. During the kneading, after the temperature of the rubber reached a preset reaction temperature, the temperature of the rubber was controlled to the reaction temperature ±3° C. The kneading was stopped once a predetermined period of time (reaction time) had elapsed. The reaction temperature and reaction time in each example were shown in Table 1 or 2.
(Second Step)
The first kneaded mixture was introduced and further kneaded in a Banbury mixer to prepare a second kneaded mixture. The kneading was carried out under the same conditions as in the first step.
(Third Step)
The second kneaded mixture, sulfur, and vulcanization accelerators were introduced and kneaded in an open roll mill to prepare an unvulcanized rubber composition. The kneading was stopped once the temperature of the rubber reached 110° C. The kneading time was five minutes.
(Vulcanization Step)
The unvulcanized rubber composition was formed into a tread shape and assembled with other tire components on a tire building machine, followed by press-vulcanization at 170° C. for 20 minutes to prepare a test tire (tire size: 11×7.10-5).
The test tires prepared as above were evaluated as described below. Tables 1 and 2 show the results. Comparative Example 1-1 was used as a standard for comparison of Examples 1-1 to 1-10 and Comparative Examples 1-1 to 1-3.

Comparative Example 2-1 was used as a standard for comparison between Example 2-1 and Comparative Example 2-1.

(Abrasion Resistance)

The abrasion loss of samples taken from the tread of each test tire was measured with a Lambourn abrasion tester at room temperature, an applied load of 1.0 kgf, and a slip ratio of 30%. The measurements are expressed as an index using the equation below. A higher index indicates better abrasion resistance.

(Abrasion resistance index)=(Abrasion loss of standard comparative example)/(abrasion loss of each formulation example)×100

(Fuel Economy)

The loss tangent (tan δ) at 60° C. of samples taken from the tread of each test tire was measured with a viscoelastic spectrometer (available from Ueshima Seisakusho Co., Ltd.) at an initial strain of 10%, a dynamic strain of 2%, and a frequency of 10 Hz. The tan δ values are expressed as an index using the equation below, with the standard comparative example set equal to 100. A higher index indicates better fuel economy.

(Fuel economy index)=(tan δ of standard comparative example)/(tan δ of each formulation example)×100

As shown in Tables 1 and 2, the compositions including both features, i.e., use of the specific silane coupling agent according to the present application and reduction of the amount of sulfur, exhibited significantly improved abrasion resistance while maintaining good fuel economy. In particular, comparison of Comparative Examples 1-1 to 1-3 with Example 1-1 demonstrates that the use of both features synergistically improves abrasion resistance and the average of abrasion resistance and fuel economy.

TABLE 1

| | | | Comparative Example | | | Example | | | | | | | | | | |
|---|---|---|---|---|---|---|---|---|---|---|---|---|---|---|---|---|
| | | | 1-1 | 1-2 | 1-3 | 1-1 | 1-2 | 1-3 | 1-4 | 1-5 | 1-6 | 1-7 | 1-8 | 1-9 | 1-10 |
| Formulation (parts by mass) | First step/ Second step | SBR | 80 | 80 | 80 | 80 | 80 | 80 | 80 | 80 | 80 | 80 | 80 | 80 | 80 |
| | | BR | 20 | 20 | 20 | 20 | 20 | 20 | 20 | 20 | 20 | 20 | 20 | 20 | 20 |
| | | Silica | 100 | 100 | 100 | 100 | 100 | 100 | 100 | 100 | 100 | 100 | 100 | 100 | 100 |
| | | Carbon black | 5 | 5 | 5 | 5 | 5 | 5 | 5 | 5 | 5 | 5 | 5 | 5 | 5 |
| | | Silane coupling agent 1 | — | — | 10 | 10 | 10 | 5 | 15 | — | — | — | 10 | 10 | 15 |
| | | Silane coupling agent 2 | 10 | 10 | — | — | — | — | — | — | — | — | — | — | — |
| | | Silane coupling agent 3 | — | — | — | — | — | — | — | 10 | — | — | — | — | — |
| | | Silane coupling agent 4 | — | — | — | — | — | — | — | — | 10 | — | — | — | — |
| | | Silane coupling agent 5 | — | — | — | — | — | — | — | — | — | 10 | — | — | — |
| | | Oil | 8 | 8 | 8 | 8 | 8 | 8 | 8 | 8 | 8 | 8 | 8 | 8 | 8 |
| | | Resin | 15 | 15 | 15 | 15 | 15 | 15 | 15 | 15 | 15 | 15 | 15 | 15 | 15 |
| | | Zinc oxide | 2 | 2 | 2 | 2 | 2 | 2 | 2 | 2 | 2 | 2 | 2 | 2 | 2 |
| | | Stearic acid | 1 | 1 | 1 | 1 | 1 | 1 | 1 | 1 | 1 | 1 | 1 | 1 | 1 |
| | | Wax | 2 | 2 | 2 | 2 | 2 | 2 | 2 | 2 | 2 | 2 | 2 | 2 | 2 |
| | | Antioxidant | 2 | 2 | 2 | 2 | 2 | 2 | 2 | 2 | 2 | 2 | 2 | 2 | 2 |
| | | Reaction temperature (° C.) | 150 | 150 | 150 | 150 | 150 | 150 | 150 | 150 | 150 | 150 | 150 | 150 | 150 |
| | | Reaction time (sec) | 0 | 0 | 0 | 0 | 300 | 0 | 0 | 0 | 0 | 0 | 0 | 0 | 0 |
| | | Sulfur | 1.6 | 1.0 | 1.6 | 1.0 | 1.0 | 1.0 | 1.0 | 1.0 | 1.0 | 1.0 | 1.4 | 0.7 | 1.4 |
| | | Vulcanization accelerator 1 | 2 | 2 | 2 | 2 | 2 | 2 | 2 | 2 | 2 | 2 | 2 | 2 | 2 |
| | | Vulcanization accelerator 2 | 1 | 1 | 1 | 1 | 1 | 1 | 1 | 1 | 1 | 1 | 1 | 1 | 1 |
| Evaluation | | Abrasion resistance index | 100 | 103 | 115 | 130 | 135 | 120 | 120 | 127 | 133 | 135 | 123 | 138 | 125 |
| | | Fuel economy index | 100 | 96 | 102 | 101 | 110 | 100 | 103 | 98 | 103 | 105 | 104 | 100 | 106 |

TABLE 2

| | | | Comparative Example 2-1 | Example 2-1 |
|---|---|---|---|---|
| Formulation (parts by mass) | First step/ Second step | NR | 20 | 20 |
| | | SBR | 65 | 65 |
| | | BR | 15 | 15 |
| | | Silica | 55 | 55 |
| | | Carbon black | 20 | 20 |
| | | Silane coupling agent 1 | — | 5.5 |
| | | Silane coupling agent 2 | 5.5 | — |
| | | Silane coupling agent 3 | — | — |
| | | Silane coupling agent 4 | — | — |
| | | Silane coupling agent 5 | — | — |
| | | Oil | 8 | 8 |
| | | Resin | 15 | 15 |
| | | Zinc oxide | 2 | 2 |
| | | Stearic acid | 1 | 1 |
| | | Wax | 2 | 2 |
| | | Antioxidant | 2 | 2 |
| | | Reaction temperature (° C.) | 150 | 150 |
| | | Reaction time (sec) | 0 | 0 |
| | Third step | Sulfur | 1.6 | 1.0 |
| | | Vulcanization accelerator 1 | 2 | 2 |
| | | Vulcanization accelerator 2 | 1 | 1 |
| Evaluation | | Abrasion resistance index | 100 | 120 |
| | | Fuel economy index | 100 | 100 |

The invention claimed is:

1. A rubber composition for tires, comprising:
   a silane coupling agent containing an alkoxysilyl group and a sulfur atom, the alkoxysilyl group being linked to the sulfur atom by six or more carbon atoms; and
   sulfur,
   wherein
   the silane coupling agent is an organosilicon compound wherein the ratio of the number of sulfur atoms to the number of silicon atoms is 1.0 to 1.5 as represented by the following average compositional formula (I):

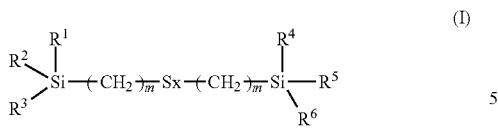

wherein
- x represents the average number of sulfur atoms;
- m represents an integer of 6 to 12; and
- $R^1$ to $R^6$ are the same or different and each represent a C1-C6 alkyl or alkoxy group, at least one of $R^1$ to $R^3$ and at least one of $R^4$ to $R^6$ are the alkoxy groups, provided that the alkyl or alkoxy groups for $R^1$ to $R^6$ may be joined to form a ring structure, and
- the rubber composition comprises, per 100 parts by mass of a rubber component therein, 1.3 parts by mass or less of the sulfur.

2. The rubber composition for tires according to claim 1, wherein the rubber composition comprising, per 100 parts by mass of the rubber component, 100 parts by mass of silica and 0.5 to 25 parts by mass of the silane coupling agent.

3. A pneumatic tire, formed from the rubber composition according to claim 1.

* * * * *